(12) United States Patent
Chen et al.

(10) Patent No.: US 12,551,643 B2
(45) Date of Patent: Feb. 17, 2026

(54) METHOD AND APPARATUS FOR SWITCHING OXYGEN SUPPLY MODE, DEVICE AND STORAGE MEDIUM

(71) Applicant: SHENYANG RMS MEDICAL TECH CO., LTD, Liaoning (CN)

(72) Inventors: Shaochun Chen, Liaoning (CN); Fanyue Ji, Liaoning (CN); Shuang Li, Liaoning (CN); Kuncheng Gai, Liaoning (CN); Xuchen Lu, Liaoning (CN); Enliang Wang, Liaoning (CN); Hanwen Yan, Liaoning (CN); Zhe Wang, Liaoning (CN); Chengguang Zhou, Liaoning (CN)

(73) Assignee: SHENYANG RMS MEDICAL TECH CO., LTD, Shenyang (CN)

( * ) Notice: Subject to any disclaimer, the term of this patent is extended or adjusted under 35 U.S.C. 154(b) by 0 days.

(21) Appl. No.: 19/178,216

(22) Filed: Apr. 14, 2025

(65) Prior Publication Data

US 2025/0319270 A1 Oct. 16, 2025

(30) Foreign Application Priority Data

Apr. 12, 2024 (CN) .......................... 202410437958.0

(51) Int. Cl.
*A61M 16/00* (2006.01)
*A61M 16/20* (2006.01)

(52) U.S. Cl.
CPC ........ *A61M 16/024* (2017.08); *A61M 16/202* (2014.02)

(58) Field of Classification Search
CPC ............ A61M 16/024; A61M 16/1005; A61M 2205/3334; A61M 2205/502; A61M 2230/205
See application file for complete search history.

(56) References Cited

U.S. PATENT DOCUMENTS 6,470,885 B1 10/2002 Blue et al.
2011/0247621 A1 10/2011 Richard et al.
(Continued)

FOREIGN PATENT DOCUMENTS

CN 111821551 A 10/2020
CN 112546388 A 3/2021
(Continued)

OTHER PUBLICATIONS

English translation of CN117100955 (Year: 2023).*
(Continued)

*Primary Examiner* — Kendra D Carter
*Assistant Examiner* — Maap Ellabib
(74) *Attorney, Agent, or Firm* — Jacob M. Ward; Ward Law Office LLC (57) ABSTRACT

The present disclosure provides a method and apparatus for switching oxygen supply mode, a device and a storage medium, the method includes: a first respiratory state of a user is detected when an intelligent mode is detected as activated; a first oxygen supply mode is determined according to the first respiratory state and oxygen is supplied according to the first oxygen supply mode; a second respiratory state of the user under the first oxygen supply mode is detected and whether to switch the first oxygen supply mode to a second oxygen supply mode is determined according to the second breathing mode; and the supplying oxygen according to the first oxygen supply mode includes: when the first oxygen supply mode is the pulse oxygen supply mode, determining the target operating gear and operating at the target operating gear.

10 Claims, 4 Drawing Sheets

(56) References Cited

U.S. PATENT DOCUMENTS

| | | |
|---|---|---|
| 2020/0289784 A1* | 9/2020 | Commerford ..... A61B 5/14551 |
| 2022/0219022 A1 | 7/2022 | Barker et al. |
| 2023/0023722 A1 | 1/2023 | Warren |
| 2023/0158261 A1 | 5/2023 | Trias et al. |
| 2024/0108843 A1 | 4/2024 | Rauker |

FOREIGN PATENT DOCUMENTS

| | | | | |
|---|---|---|---|---|
| CN | 114917440 A | | 8/2022 | |
| CN | 117085223 A | | 11/2023 | |
| CN | 117100955 A | * | 11/2023 | .......... A61M 16/024 |
| CN | 117398557 A | | 1/2024 | |
| JP | 2014039654 A | | 3/2014 | |

OTHER PUBLICATIONS

The State Intellectual Property Office of People's Republic of China, Notification to Grant Patent Right for Invention for Chinese Patent Application No. 202410437958.0, Dated May 31, 2024, 9 pages.

The State Intellectual Property Office of People's Republic of China, First Office Action for Chinese Patent Application No. 202410437958.0, Dated May 17, 2024, 15 pages.

* cited by examiner

METHOD AND APPARATUS FOR SWITCHING OXYGEN SUPPLY MODE, DEVICE AND STORAGE MEDIUM

CROSS-REFERENCE TO RELATED APPLICATIONS

This application claims priority to Chinese Patent Application No. 202410437958.0, filed on Apr. 12, 2024, which is hereby incorporated by reference in its entirety.

TECHNICAL FIELD

The present disclosure relates to the technical field of oxygen concentrators, and in particular to a method and apparatus for switching oxygen supply mode, a device and a storage medium.

BACKGROUND

Portable oxygen concentrators differ from medical oxygen concentrators in that they are compact, lightweight, and easy to carry, making them suitable for use in various environments such as home or travel to meet the oxygen needs of different users.

The oxygen production technology used by the portable oxygen concentrators is generally pressure swing adsorption or vacuum pressure swing adsorption. The principle is to use air as raw material, use zeolite molecular sieves to adsorb nitrogen and other gases in the air, and finally separate oxygen-enriched air. The oxygen supply modes of existing portable oxygen concentrators generally include a continuous oxygen supply mode and a pulse oxygen supply mode. The continuous oxygen supply mode provides oxygen continuously with a constant flow rate. The oxygen provided by the pulse oxygen supply mode is supplied in stages according to the system settings. When the above two modes are ran at the same oxygen supply flow rate, the continuous oxygen supply mode can only enable the user to obtain approximately 30% of the oxygen supply. The pulse oxygen supply mode allows the user to obtain approximately 100% of the oxygen supply. The switching between the above two oxygen supply modes can be completed through manual operation; among them, in the pulse oxygen supply mode, there are usually multiple pulse gear settings to provide different oxygen supply flow rates to meet user's oxygen inhalation needs in different activity states, and the switching between multiple pulse gears is also completed by manual operation.

At present, the portable oxygen concentrators often have the following problems in practical use: one situation is that when the user is sleeping or wearing the oxygen tube poorly, if the pulse oxygen supply mode is used at this time, the negative pressure value when the user inhales cannot reach the trigger threshold, the device will stop supplying oxygen. The device will only resume oxygen supply when the negative pressure of the user's inhalation triggers the threshold again, which will affect the user's oxygen inhalation effect. Another situation is that when the user is in an active state, the amount of oxygen supply required by the user will increase as the respiratory rate increases. If the device is in the continuous oxygen supply mode at this time, the user may not be able to obtain enough oxygen. The amount of oxygen cannot meet the user's oxygen needs, and unable to play an improvement role when the user has a low blood oxygen saturation.

In general, current portable oxygen concentrators cannot automatically adjust the oxygen supply mode according to the user's needs, and there are many inconvenient problems in use.

SUMMARY

The present disclosure provides a method and apparatus for switching oxygen supply mode, a device and a storage medium, which are used to solve the problems in the related art that the switching of the oxygen supply mode can only be carried out through manual operation, the oxygen generator cannot automatically adjust the oxygen supply mode according to the user's needs, and there are inconveniences in use.

In a first aspect, the present disclosure provides a method for switching an oxygen supply mode, including:
  detecting a first respiratory state of a user when an intelligent mode is detected as activated;
  determining a first oxygen supply mode according to the first respiratory state and supplying oxygen according to the first oxygen supply mode;
  the supplying oxygen according to the first oxygen supply mode includes:
  when the first oxygen supply mode is the pulse oxygen supply mode, determining the target operating gear and operating at the target operating gear.

In an implementation, the first respiratory state is whether a respiratory action exists within a first preset duration; the determining the first oxygen supply mode according to the first respiratory state includes:
  when the first respiratory state indicates existence of a respiratory action within the first preset duration, determining the first oxygen supply mode to be the pulse oxygen supply mode, where the existence of the respiratory action represents that a pressure in an oxygen delivery tube at a first time instant is less than a first trigger threshold and a pressure in the oxygen delivery tube at a second time instant is greater than a second trigger threshold; and the second time instant is after the first time instant;
  when the first respiratory state indicates inexistence of a respiratory action within the first preset duration, determining the first oxygen supply mode to be the continuous oxygen supply mode.

In an implementation, the determining, according to the second respiratory state, whether to switch the first oxygen supply mode to the second oxygen supply mode includes:
  the second respiratory state is the same as the first respiratory state when the first oxygen supply mode is the pulse oxygen supply mode, and when the second respiratory state indicates inexistence of a respiratory action within the first preset duration, switching the pulse oxygen supply mode to the continuous oxygen supply mode;
  when the first oxygen supply mode is the continuous oxygen supply mode, switching the continuous oxygen supply mode to the pulse oxygen supply mode when the second respiratory state indicates existence of N respiratory action within a second preset duration.

In an implementation, the method further includes:
  obtaining a first pressure curve of a previous operating cycle, and shifting the first pressure curve downward by a first value to obtain a second pressure curve;
  obtaining a third pressure curve of a current operating cycle, and determining that there is an inhalation action when the third pressure curve and the second pressure curve have an intersection point; and determining that there is an exhalation action when a pressure difference at a corresponding time instant in the previous operating cycle and the current operating cycle exceeds a second value;

determining existence of N respiratory action within the second preset duration when a count value of an inhalation action and a count value of an exhalation action respectively reach N within the second preset duration.

In an implementation, the supplying oxygen according to the first oxygen supply mode, includes:

determining a blood oxygen saturation of the user under N respiratory action when the first oxygen supply mode is the pulse oxygen supply mode;

when the blood oxygen saturation is less than the target blood oxygen saturation, determining a total amount of oxygen pulses according to a respiratory rate of the user and the blood oxygen saturation under N respiratory action;

calculating a first multiplication result of the total amount of oxygen pulses and a first coefficient, calculating a second multiplication result of a square value of the total amount of oxygen pulses and a second coefficient, calculating an addition result of the first multiplication result, the second multiplication result and a third coefficient, determining the addition result as a target operating gear, and operating at the target operating gear;

and/or, when the blood oxygen saturation is greater than or equal to the target blood oxygen saturation, determining a default operating gear as a target operating gear and operating at the target operating gear.

In an implementation, the determining the total amount of oxygen pulses according to the respiratory rate of the user and the blood oxygen saturation under N respiratory action includes:

calculating a difference between the target blood oxygen saturation and the blood oxygen saturation for each blood oxygen saturation, and calculating an integral result of the difference from a first time instant to a N-th time instant, where the N-th time instant represents a time instant when a respiratory action is detected for a N-th time;

calculating a third multiplication result of a fourth coefficient and a respiratory rate, calculating a fourth multiplication result of the third multiplication result and the integral result, and determining the fourth multiplication result as the total amount of oxygen pulses.

In an implementation, after operating at the target operating gear, the method further includes:

obtaining a current blood oxygen saturation of the user, if the current blood oxygen saturation is between a first blood oxygen saturation and a second blood oxygen saturation, controlling the target operating gear to remain unchanged; if the current blood oxygen saturation is greater than the second blood oxygen saturation, reducing the target operating gear; if the current blood oxygen saturation is less than the first blood oxygen saturation, increasing the target operating gear; where the target blood oxygen saturation is greater than the first blood oxygen saturation and less than the second blood oxygen saturation.

In a second aspect, the present disclosure provides an apparatus for switching an oxygen supply mode, including:

a detection module, configured to detect a first respiratory state of a user when an intelligent mode is detected as activated;

a processing module, configured to determine a first oxygen supply mode according to the first respiratory state and supply oxygen according to the first oxygen supply mode;

when supplying oxygen according to the first oxygen supply mode, the processing module is specifically configured to:

when the first oxygen supply mode is the pulse oxygen supply mode, determine the target operating gear and operating at the target operating gear.

In a third aspect, the present disclosure provides an electronic device, including: at least one processor and a memory;

the memory stores computer execution instructions;

the at least one processor executes computer execution instructions stored in the memory, enabling the at least one processor to execute the method according to any one of the first aspect.

In a fourth aspect, the present disclosure provides a computer-readable storage medium, the computer readable storage medium stores computer execution instructions, and when a processor executes the computer execution instructions, the method of any one of the first aspects is implemented.

In the method and apparatus for switching oxygen supply mode, the device and the storage medium provided by the present disclosure, a first respiratory state of a user is detected when an intelligent mode is detected as activated; a first oxygen supply mode is determined according to the first respiratory state and oxygen is supplied according to the first oxygen supply mode; a second respiratory state of the user under the first oxygen supply mode is detected and whether to switch the first oxygen supply mode to a second oxygen supply mode is determined according to the second breathing mode, where the oxygen supply mode includes a pulse oxygen supply mode and a continuous oxygen supply mode; and the supplying oxygen according to the first oxygen supply mode includes: when the first oxygen supply mode is the pulse oxygen supply mode, determining the target operating gear and operating at the target operating gear. In this way, it can automatically switch between the two oxygen supply modes according to the needs of the user and automatically determine the target operating gear suitable for the user in the pulse oxygen supply mode, meeting the oxygen inhalation needs of the user in different scenarios and improving the usage effect of the user. At the same time, this method can improve the oxygen utilization rate, extend the service life of the oxygen generation device, and reduce the usage cost while ensuring the oxygen supply.

BRIEF DESCRIPTION OF DRAWINGS

The accompanying drawings, which are incorporated in and constitute a part of this specification, illustrate embodiments consistent with the present disclosure and together with the description serve to explain the principles of the present disclosure.

Specific embodiments of the present disclosure have been shown in the above-mentioned drawings and will be described in more detail below. These drawings and written description are not intended to limit the scope of the inventive concepts in any way, but rather to illustrate the concepts of the present disclosure to those skilled in the art with reference to specific embodiments.

DESCRIPTION OF EMBODIMENTS

Exemplary embodiments will be described in detail herein, examples of which are illustrated in the accompanying drawings. When the following description refers to the drawings, the same numbers in different drawings refer to the same or similar elements unless otherwise indicated. The implementations described in the following exemplary embodiments do not represent all implementations consistent with the present disclosure.

Figure 1:
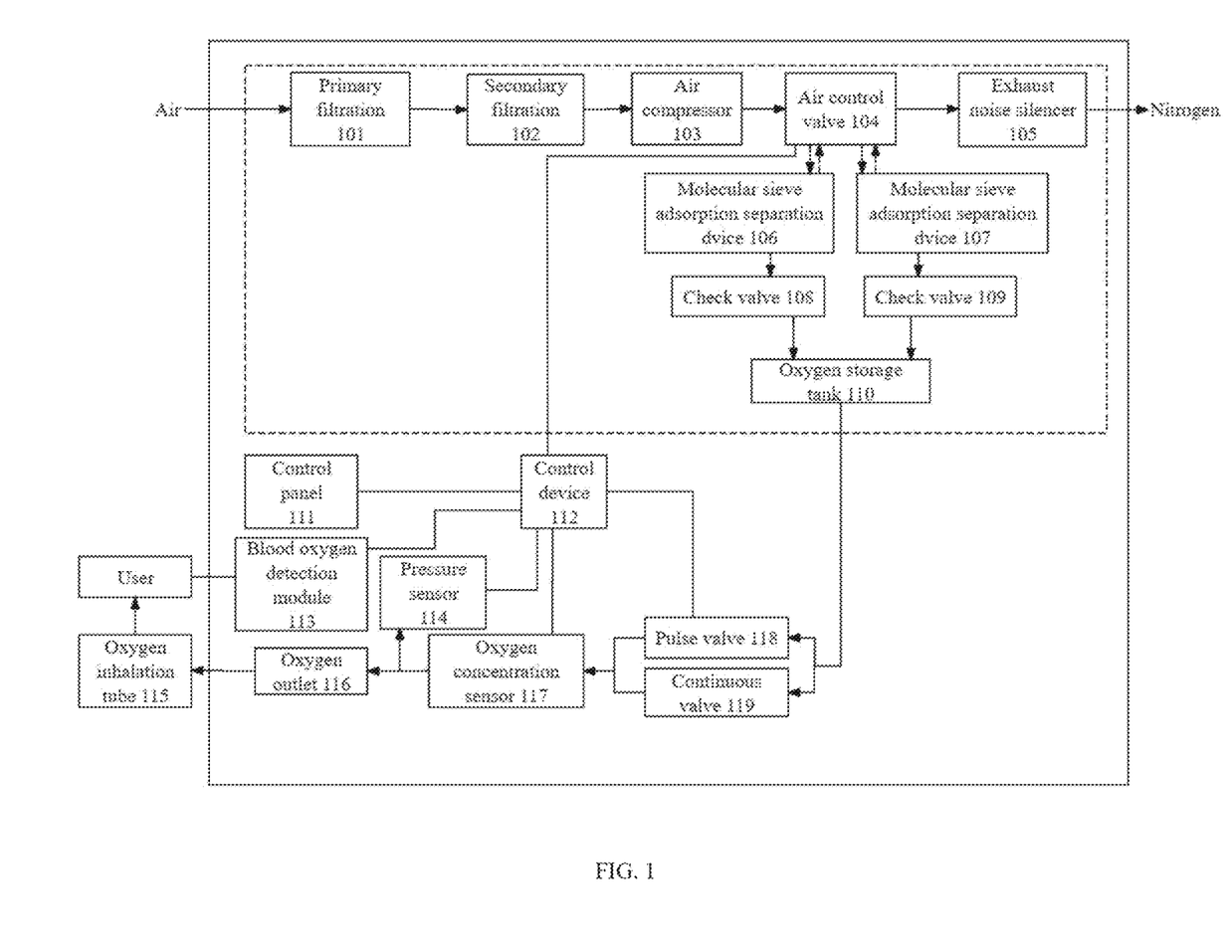
FIG. 1 is a schematic diagram of the principle of a portable oxygen concentrator provided by an embodiment of the present disclosure.

Existing portable oxygen concentrators produce oxygen based on pressure swing adsorption. FIG. 1 is a schematic diagram of a portable oxygen concentrator provided by an embodiment of the present disclosure, as shown in FIG. 1, the air enters an air compressor 103 through primary filtration 101 and secondary filtration 102. The air compressor 103 can compress the air. The compressed air enters an air control valve 104. The air control valve 104 is connected to two molecular sieve adsorption separation devices 106 and 107. When the compressed air flows into one molecular sieve adsorption separation device for oxygen production, the other molecular sieve adsorption separation device releases the separated nitrogen. The air control valve 104 can control the flow of gas in or out of the two molecular sieve adsorption separation devices 106 and 107. The nitrogen discharged through the air control valve 104 is discharged to the atmosphere through an exhaust noise silencer 105; the oxygen produced by the molecular sieve adsorption separation device is stored in an oxygen storage tank 110 through a check valve 108 and a check valve 109. The oxygen storage tank 110 is connected to a pulse valve 118 and a continuous valve 119; the produced oxygen enters an oxygen inhalation tube 115 through an oxygen concentration sensor 117 and an oxygen outlet 116, and is delivered to the user. At the same time, a control panel 111 can be set up on the portable oxygen concentrator, and a control device 112 can be connected to the control panel 111 to control, according to the oxygen supply mode selected in the control panel 111, the opening or closing of the corresponding valve.

In addition, the portable oxygen concentrator is also equipped with a pressure sensor 114 and a blood oxygen detection module 113. One end of the pressure sensor 114 is connected to an outlet of the oxygen concentration sensor 117, and the other end is connected to the control device 112 so that the control device 112 can obtain the pressure value in the oxygen inhalation tube 115. One end of the blood oxygen detection module 113 is directly connected to the user, and the other end is connected to the control device 112, so that the control device 112 can obtain blood oxygen saturation of the user.

Figure 2:
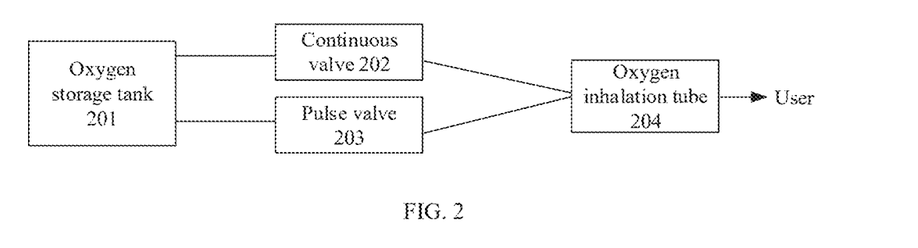
FIG. 2 is a schematic diagram of gas circuit control provided by an embodiment of the present disclosure.

FIG. 2 is a schematic diagram of gas circuit control provided by an embodiment of the present disclosure. In order to realize different oxygen supply modes, two valves are used on the oxygen supply circuit to supply oxygen in parallel, an oxygen storage tank 201 delivers the oxygen-enriched gas through a continuous valve 202 or a pulse valve 203 from an oxygen inhalation tube 204 to the user on demand. In the pulse oxygen supply mode, the pulse valve 203 can be opened intermittently according to the respiratory action, or the pulse valve 203 can be closed; in the continuous oxygen supply mode, the continuous valve 202 can be controlled to open to achieve continuous oxygen supply.

The purpose of using two-way valve control is to meet the needs of two oxygen supply modes. In the pulse oxygen supply mode, oxygen needs to be supplied quickly. Therefore, the aperture of the valve needs to be increased to increase the peak oxygen flow rate and achieve rapid oxygen supply. In the pulse oxygen supply mode, it is necessary to determine the single oxygen supply amount, limit the consistency of each oxygen pulse amount, and complete the delivery of oxygen in the first 60% of the user's inhalation time. The continuous oxygen supply mode means continuous oxygen supply. During the oxygen supply process, the valve is in a normally open state. Since the two molecular sieve adsorption separation devices produce oxygen in a time-sharing and alternating manner, the pressure in the oxygen storage tank fluctuates. Therefore, the aperture of the gas circuit needs to be reduced.

With existing portable oxygen concentrators, when the user is sleeping or wearing the oxygen tube poorly, if the device is in the pulse oxygen supply mode at this time, the negative pressure value when the user inhales cannot reach the trigger threshold, the device will stop supplying oxygen. The device will only resume oxygen supply when the negative pressure of the user's inhalation triggers the threshold again, which will affect the user's oxygen inhalation effect. Another situation is that when the user is in an active state, the amount of oxygen supply required by the user will increase as the respiratory rate increases. If the device is in the continuous oxygen supply mode at this time, it provides oxygen at a fixed supply flow rate, but the flow velocity is low, and the user inhales less oxygen, which cannot meet the user's oxygen inhalation needs, nor can it improve the situation when the user has a low blood oxygen saturation (when the blood oxygen saturation is low, it is necessary to use the pulse oxygen supply mode to increase the amount of oxygen inhaled each time and improve the blood oxygen saturation). Therefore, in the above scenarios, the user needs to manually switch the oxygen supply mode to meet the user's oxygen inhalation needs in different scenarios. The manual switching operation brings a lot of inconvenience to the user. Therefore, the present disclosure sets an intelligent mode for the oxygen generation device. When the intelligent mode is turned on, it can automatically switch between the pulse oxygen supply mode and the continuous oxygen supply mode according to a respiratory state of the user, realizing oxygen supply according to the user's needs. The oxygen utilization rate can be improve and the service life of the oxygen generation device can be extended while ensuring the oxygen supply.

Figure 3:
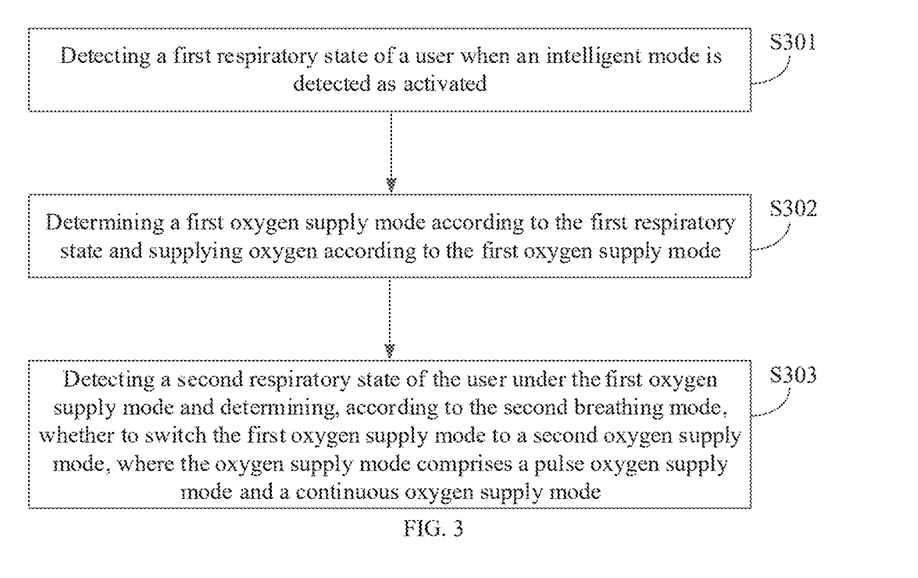
FIG. 3 is a schematic flowchart of a method for switching an oxygen supply mode provided by an embodiment of the present disclosure.

FIG. 3 is a schematic flowchart of a method for switching an oxygen supply mode provided by an embodiment of the present disclosure. As shown in FIG. 3, the method includes steps S301 to S303.

Step S301: detecting a first respiratory state of a user when an intelligent mode is detected as activated.

In order to realize automatic switching of the oxygen supply mode, an intelligent mode is set, which can be set on the control panel. When the control device detects that the intelligent mode is turned on, the first respiratory state of the user can be detected to determine a first oxygen supply mode based on the first respiratory state.

In an implementation, when it is detected that the intelligent mode is turned on, the pulse valve and the continuous valve can be controlled to close first, so that the pressure value in the oxygen inhalation tube is 0 when the user is not breathing, and then the first respiratory state is determined by means of pressure triggering. That is, the pressure value in the oxygen inhalation tube is obtained, and the pressure value is compared with the trigger threshold to determine the first respiratory state of the user.

S302: determining a first oxygen supply mode according to the first respiratory state and supplying oxygen according to the first oxygen supply mode.

After determining the first respiratory state, the first oxygen supply mode can be determined, and then the valve corresponding to the first oxygen supply mode can be controlled to open.

When it is determined that the first oxygen supply mode is the pulse oxygen supply mode, the pulse valve can be controlled to open and close on time for oxygen supply. When the first oxygen supply mode is the continuous oxygen supply mode, the continuous valve can be controlled to open for oxygen supply.

The supplying oxygen according to the first oxygen supply mode includes:

when the first oxygen supply mode is the pulse oxygen supply mode, determining the target operating gear and operating at the target operating gear.

Since the pulse oxygen supply mode usually has multiple operating gears, the user is usually required to manually select an appropriate operating gear, which is inconvenient to use. In the present disclosure, when it is determined that the oxygen concentrator is operated in the first oxygen supply mode, the target operating gear can be automatically determined, thereby eliminating the need for the user to manually select the appropriate operating gear and improving the user experience.

S303: detecting a second respiratory state of the user under the first oxygen supply mode and determining, according to the second breathing mode, whether to switch the first oxygen supply mode to a second oxygen supply mode, where the oxygen supply mode includes a pulse oxygen supply mode and a continuous oxygen supply mode.

When the portable oxygen concentrator is operated in the first oxygen supply mode, the second respiratory state of the user can be obtained in real time, so as to determine, according to the second respiratory state, whether to continue to use the first oxygen supply mode for oxygen supply or to switch to the second respiratory state.

When it is detected that the breathing intensity is weak, there is no inhalation action, the patient is sleeping or the oxygen tube is poorly worn, if the pulse oxygen supply mode is continued to be used for oxygen supply, there will be a problem of being unable to supply oxygen in a timely manner. In this case, the continuous oxygen supply can be used. When the user has an inhalation action, if the continuous oxygen supply mode continues to be used, since the user cannot inhale oxygen when exhaling, there will be a problem of low oxygen utilization and insufficient oxygen intake by the user; in addition, when the patient is in an active state, the problem of low blood oxygen saturation is prone to occur. If the continuous oxygen supply mode continues to be used for oxygen supply, the oxygen flow rate will be low and the problem of low blood oxygen saturation cannot be improved. Therefore, by detecting the second respiratory state, the oxygen supply mode can be switched to be more suitable for the current respiratory situation of the user, thereby improving the oxygen utilization rate while ensuring the oxygen supply, thus extending the service life of the oxygen concentrator.

In order to achieve the characteristics of compact structure, small size and light weight, portable oxygen concentrators have certain limitations on molecular sieve adsorption capacity and battery life. By setting the intelligent mode, the pulse oxygen supply mode can be used to supply oxygen when the user meets the conditions, the pulse oxygen supply mode is an intermittent oxygen supply mode. Compared with the continuous oxygen supply mode, it can save costs, extend the service life of the device, and also increase the battery life.

The method provided by the present disclosure can also improve the use effect of the user. When the user has an inhalation action, if the user continues to use the continuous oxygen supply mode for oxygen supply, the user cannot quickly inhale a large amount of oxygen, so the oxygen inhalation effect of the user is poor. If the pulse oxygen supply mode is used, it is possible to quickly inhale a large amount of oxygen and the oxygen inhalation effect of the user can be improved.

In the method for switching oxygen supply mode provided by the present disclosure, a first respiratory state of a user is detected when an intelligent mode is detected as activated; a first oxygen supply mode is determined according to the first respiratory state and oxygen is supplied according to the first oxygen supply mode; a second respiratory state of the user under the first oxygen supply mode is detected and whether to switch the first oxygen supply mode to a second oxygen supply mode is determined according to the second breathing mode, where the oxygen supply mode includes a pulse oxygen supply mode and a continuous oxygen supply mode; and the supplying oxygen according to the first oxygen supply mode includes: when the first oxygen supply mode is the pulse oxygen supply mode, determining the target operating gear and operating at the target operating gear. In this way, it can automatically switch between the two oxygen supply modes according to the needs of the user and automatically determine the target operating gear suitable for the user in the pulse oxygen supply mode, meeting the oxygen inhalation needs of the user in different scenarios and improving the usage effect of the user. At the same time, this method can improve the oxygen utilization rate, extend the service life of the oxygen generation device, and reduce the usage cost while ensuring the oxygen supply.

In an implementation, the first respiratory state is whether a respiratory action exists within a first preset duration; the determining the first oxygen supply mode according to the first respiratory state includes:

when the first respiratory state indicates existence of a respiratory action within the first preset duration, determining the first oxygen supply mode to be the pulse oxygen supply mode, where the existence of the respiratory action represents that a pressure in an oxygen delivery tube at a first time instant is less than a first trigger threshold and a pressure in the oxygen delivery tube at a second time instant is greater than a second trigger threshold; and the second time instant is after the first time instant;

when the first respiratory state indicates inexistence of a respiratory action within the first preset duration, determining the first oxygen supply mode to be the continuous oxygen supply mode.

When determining the first oxygen supply mode, the first respiratory state can initially be determined using a pressure-triggered method. In order to quickly determine the first oxygen supply mode, the first respiratory state may be whether a respiratory action exists within a first preset duration. For example, the first preset period may be 30 seconds. When there is a respiratory action within the first preset period, the pulse oxygen supply mode is used to supply oxygen. The presence of the respiratory action means that the pressure value in the oxygen inhaling tube at the first time instant is detected to be less than the first trigger threshold and the pressure value in the oxygen inhaling tube at the second time instant is detected to be greater than the second trigger threshold; the second time instant is located after the first time instant. When the above conditions are met, it means that one inhalation action and one exhalation action are detected, and the pulse oxygen supply mode can be used to supply oxygen to improve oxygen utilization. For example, when the respiratory action is detected at the 10-th second, the pulse valve is opened to supply oxygen using the pulse oxygen supply mode.

Figure 4:
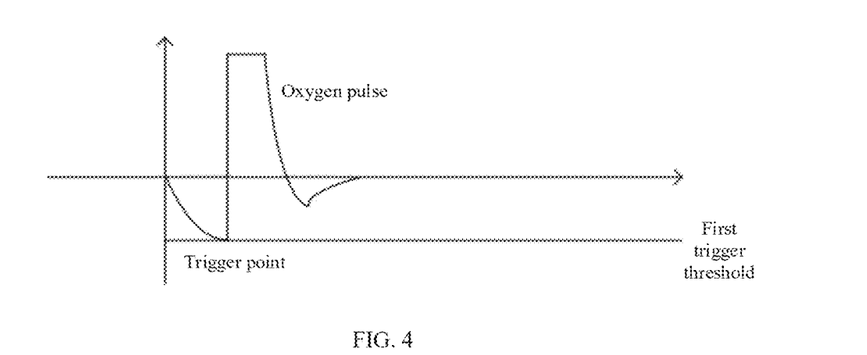
FIG. 4 is a schematic diagram of the triggering of the pulse oxygen supply mode provided by an embodiment of the present disclosure.

FIG. 4 is a schematic diagram of the triggering of the pulse oxygen supply mode provided by an embodiment of the present disclosure, as shown in FIG. 4, after it is determined that the pulse oxygen supply mode is used to supply oxygen, when the inhalation action is detected, that is, the pressure value in the oxygen inhalation tube is detected to be less than the first trigger threshold, the pulse valve can be opened. When the amount of oxygen transmitted is detected to reach a single oxygen pulse amount, close the pulse valve.

On the contrary, when the first respiratory state indicates inexistence of a respiratory action within the first preset duration, the first oxygen supply mode is determined to be the continuous oxygen supply mode. At this time, the continuous oxygen supply mode is adopted to ensure that the user can inhale oxygen in any state. For example, when no respiratory action is detected within 30 seconds, the continuous valve is opened in the next second to provide oxygen in the continuous oxygen supply manner, where both the pulse valve and the continuous valve are closed in the first 30 seconds.

Determining the respiratory state by means of the pressure-triggered method means that when inhaling, the user needs to reduce the alveolar pressure to generate a pressure gradient between the alveoli and the oral cavity, so that the oral pressure is higher than the alveolar pressure to generate inhalation. When the user has no inhalation action, the pressure inside the oxygen inhalation tube is the same as the pressure in the atmospheric environment. When the user inhales, the pressure in the oxygen inhalation tube will be lower than the pressure of the atmospheric environment. When the pressure in the oxygen inhalation tube drops below the first trigger threshold, it can be determined that there is an inhalation action. When the user exhales, the pressure in the oxygen inhalation tube will be greater than the pressure of the atmospheric environment. When the pressure value in the oxygen inhalation tube is greater than the second trigger threshold, it can be determined that there is an exhalation action. Among them, the first trigger threshold and the second trigger threshold can determine the trigger sensitivity. The first trigger threshold is a negative value. When the first trigger threshold is larger, smaller inhalation force is needed to trigger the pulse oxygen supply mode; on the contrary, when the first trigger threshold is smaller, a larger inhalation force is required to trigger the pulse oxygen supply mode. Therefore, the first trigger threshold and the second trigger threshold can be set according to the actual situation.

By determining the first oxygen supply mode through the first respiratory state, the first oxygen supply mode can be determined quickly and accurately.

In an implementation, the determining, according to the second respiratory state, whether to switch the first oxygen supply mode to the second oxygen supply mode includes:

the second respiratory state is the same as the first respiratory state when the first oxygen supply mode is the pulse oxygen supply mode, and when the second respiratory state indicates inexistence of a respiratory action within the first preset duration, switching the pulse oxygen supply mode to the continuous oxygen supply mode;

when the first oxygen supply mode is the continuous oxygen supply mode, switching the continuous oxygen supply mode to the pulse oxygen supply mode when the second respiratory state indicates existence of N respiratory action within a second preset duration.

When determining whether to switch from the first oxygen supply mode to the second oxygen supply mode, it may be determined by the second respiratory state. The second respiratory state may be whether there is a respiratory action within the first preset period, and whether there are N respiratory actions within the second preset period, which may be specifically determined according to the first oxygen supply mode.

When the first oxygen supply mode is the pulse oxygen supply mode, the second respiratory state is whether there is a respiratory action within the first preset period; when the first oxygen supply mode is the continuous oxygen supply mode, the second respiratory state is whether there is N respiratory action within the second preset duration. For example, the first preset duration may be 30 seconds, the second preset duration may be 2 minutes, and the value of N may be 3. Since when switching from the continuous oxygen supply mode to the pulse oxygen supply mode, it is necessary to confirm that the user has stable respiratory actions. Therefore, it may be detected whether there are N respiratory actions within the second preset period, so as to switch to the pulse oxygen supply mode when the breathing is stable.

Therefore, in the pulse oxygen supply mode, when it is detected that there is no respiratory action within the first preset duration, it can be switched to the continuous oxygen supply mode; when it is detected that there is respiratory action within the first preset duration, it will continue to be in the pulse oxygen supply mode. In the continuous oxygen supply mode, when it is detected that there are N respiratory actions in the second preset duration (the count value of the respiratory actions is greater than or equal to N), then it switches to the pulse oxygen supply mode; when it is detected that there are no N respiratory actions in the second preset duration (the count value of respiratory actions is less than N), it will continue to be in continuous oxygen supply mode.

Through the above judgment conditions, it is possible to switch from the continuous oxygen supply mode to the pulse oxygen supply mode when there is a stable respiratory action, and to switch from the pulse oxygen supply mode to the continuous oxygen supply mode when there is no respiratory action, thus achieving the accuracy switching of the oxygen supply mode.

In an implementation, the method further includes:
obtaining a first pressure curve of a previous operating cycle, and shifting the first pressure curve downward by a first value to obtain a second pressure curve;
obtaining a third pressure curve of a current operating cycle, and determining that there is an inhalation action when the third pressure curve and the second pressure curve have an inhalation action; and determining that there is an exhalation action when a pressure difference at a corresponding time instant in the previous operating cycle and the current operating cycle exceeds a second value;
determining existence of N respiratory action within the second preset duration when a count value of an inhalation action and a count value of an exhalation action respectively reach N within the second preset duration.

In the continuous oxygen supply mode, when determining whether the second breathing state is that there are N respiratory actions within the second preset duration, if the pressure-triggered method is continued to be used to determine the respiratory state, there will be an inaccuracy problem. Because in the continuous oxygen supply mode, the continuous valve is opened and oxygen will continue to be output. However, due to the working principle of the portable oxygen concentrator, the two molecular sieve adsorption devices will take turns to adsorb and release nitrogen. For example, when the molecular sieve adsorption device 1 adsorbs nitrogen, the molecular sieve adsorption device 2 releases nitrogen, thereby forming a continuous oxygen flow, and the pressure will fluctuate periodically, and the pressure-triggered method is suitable for the situation when both valves are closed, that is, when the pressure in the oxygen inhalation tube is 0.

Based on the above problem, the method of detecting breathing by images can be used to determine whether the second respiratory state is that there are N respiratory actions within the second preset duration.

Figure 5:
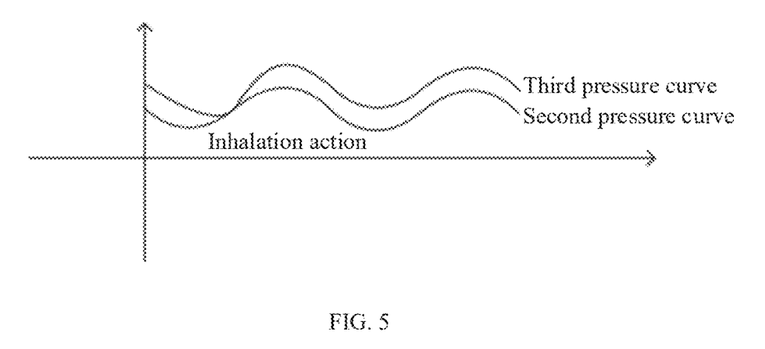
FIG. 5 is a schematic diagram of respiratory action detection through an image provided by an embodiment of the present disclosure.

FIG. 5 is a schematic diagram of respiratory action detection through an image provided by an embodiment of the present disclosure. Specifically, the pressure data of the previous operating cycle can be acquired to form a first pressure curve, and the first pressure curve can be shifted downward by a first value to obtain a second pressure curve. The pressure data of the current operating cycle is obtained to form a third pressure curve, compare the second pressure curve and the third pressure curve, and when there is no inhalation or exhalation action, the second pressure curve and the third pressure curve are parallel, there will be no intersection; when there is an inhalation action, the pressure data of the current operating cycle will become smaller, and the third pressure curve and the second pressure curve will form an intersection, and this intersection is the time instant when the inhalation action is triggered; when there is an exhalation action, the pressure data of the current operating cycle will become larger, and the data difference between the third pressure curve and the second pressure curve at the corresponding time instant (a certain time instant in the operating cycle) will exceed the second value. The time instant the second value is exceeded is the time instant when the exhalation action is triggered.

Since oxygen is continuously output in the continuous oxygen supply mode, the pressure in the oxygen inhalation tube is relatively large, and the sensitivity of the respiratory detection will be lower than that in the pulse oxygen supply mode.

Based on the above method, each inhalation action and exhalation action can be detected in the continuous oxygen supply mode. When N times of inhalation actions and N times of exhalation actions are detected within the second preset duration, it can be determined that there are N respiratory actions in the second preset duration.

In the continuous oxygen supply mode, by comparing the pressure data of two operating cycles, it can accurately detect whether the user has a respiratory action.

In an implementation, supplying oxygen according to the first oxygen supply mode, includes:
determining a blood oxygen saturation of the user under N respiratory action when the first oxygen supply mode is the pulse oxygen supply mode;
when the blood oxygen saturation is less than the target blood oxygen saturation, determining a total amount of oxygen pulses according to a respiratory rate of the user and the blood oxygen saturation under N respiratory action;
calculating a first multiplication result of the total amount of oxygen pulses and a first coefficient, calculating a second multiplication result of a square value of the total amount of oxygen pulses and a second coefficient, calculating an addition result of the first multiplication result, the second multiplication result and a third coefficient, determining the addition result as a target operating gear, and operating at the target operating gear;
and/or, when the blood oxygen saturation is greater than or equal to the target blood oxygen saturation, determining a default operating gear as a target operating gear and operating at the target operating gear.

Since the pulse oxygen supply mode has multiple operating gears, in the prior art, when the oxygen generation device is switched from the continuous oxygen supply mode to the pulse oxygen supply mode, it is necessary to manually select the operating gear, and it is also necessary to continuously debug to determine which operating gear to select. This will bring inconvenience to the user, and this method cannot provide the user with an appropriate amount of oxygen in a timely manner.

In response to the above problems, when the oxygen generation device is operating in the pulse oxygen supply mode under the intelligent mode, a target operating gear can be automatically determined, eliminating the need for the user to adjust the operating gear.

In an implementation, the blood oxygen saturation of the user can be detected during N respiratory actions. The blood oxygen saturation refers to the percentage of the capacity of oxygenated hemoglobin bound to oxygen in the blood to the total capacity of hemoglobin that can be bound, that is, the concentration of blood oxygen in the blood. The blood oxygen saturation is an important physiological parameter of respiratory circulation. When the blood oxygen saturation is low, it means that the total amount of oxygen pulses required by the current user is larger. When the blood oxygen saturation is high, it means that the total amount of oxygen pulses required by the current user is small. As shown in FIG. 1, a blood oxygen detection module can be provided between the user and the control device, and the blood oxygen saturation of the user can be obtained through the blood oxygen detection module.

In an implementation, when switching from the continuous oxygen supply mode to the pulse oxygen supply mode, it means that N times of respiratory actions have been detected within the second preset duration, at the time instant of each detected respiratory action, the blood oxygen saturation at this time can be obtained. When it is detected that the blood oxygen saturation corresponding to the time instant of each respiratory action is less than the target blood oxygen saturation, it indicates that the total amount of oxygen pulses required by the current user is large, and the total amount of oxygen pulses can be calculated according to the respiratory rate and blood oxygen saturation under N respiratory actions, and then the target operating gear can be calculated according to the total amount of oxygen pulses. When it is detected that the blood oxygen saturation corresponding to the time instant of each respiratory action is greater than the target blood oxygen saturation, it indicates that the total amount of oxygen pulses required by the current user is small. At this time, a default operating gear can be determined as the target operating gear.

For example, five operating gears can be set. The higher the operating gear, the larger the corresponding total amount of oxygen pulses. Therefore, the default operating gear can be a lower gear, such as operating gear 1 or operating gear 2.

As shown in Table 1, there can be 5 operating gears, operating gear 1 to operating gear 5, which respectively correspond to a total amount of oxygen pulses, and the higher the operating gear, the greater the total amount of oxygen pulses, that is, A<B<C<D<E.

TABLE 1

| Gear | 1 | 2 | 3 | 4 | 5 |
|---|---|---|---|---|---|
| Total amount of oxygen pulses (mL) | A | B | C | D | E |

In an implementation, after determining the total amount of oxygen pulses, the target operating gear can be calculated based on the following formula:

$$L = A + B*P + C*P^2$$

where L represents the target operating gear, A, B and C are constants, P represents the amount of oxygen pulse per unit time. The target operating gear can be accurately calculated through the above formula. If the target operating gear is determined directly by querying Table 1 above, there may not be a corresponding gear for the calculated amount of oxygen pulses. For example, the total amount of oxygen pulses is between C and D, it is impossible to determine whether the target operating gear is gear 3 or gear 4.

In an implementation, after the oxygen generation device is turned on and the intelligent mode is activated, if it directly enter the pulse oxygen supply mode, N times of respiratory actions may not be detected at this time, and the total amount of oxygen pulses cannot be directly determined. In this case, a target operating gear can be determined first. For example, when there are five operating gears, the target operating gear can be operating gear 3. After N respiratory actions are detected, the total amount of oxygen pulses can be determined again, thereby the target operating gear can be determined again and operate at the target operating gear.

After determining the target operating gear, the corresponding total amount of oxygen pulses can be determined according to Table 1, and then the single oxygen pulse amount for each breath is calculated based on the respiratory rate, and the single oxygen pulse amount is provided each time the pulse valve is opened.

By obtaining the blood oxygen saturation of the user under N respiratory actions, and determining the target operating gear based on the relationship between the blood oxygen saturation and the target blood oxygen saturation, the accuracy of the determined target operating gear is improved.

In an implementation, the determining a total amount of oxygen pulses according to a respiratory rate of the user and the blood oxygen saturation under N respiratory action, includes:

calculating a difference between the target blood oxygen saturation and the blood oxygen saturation for each blood oxygen saturation, and calculating an integral result of the difference from a first time instant to a N-th time instant, where the N-th time instant represents a time instant when a respiratory action is detected for a N-th time;

calculating a third multiplication result of a fourth coefficient and a respiratory rate, calculating a fourth multiplication result of the third multiplication result and the integral result, and determining the fourth multiplication result as the total amount of oxygen pulses.

When calculating the total amount of oxygen pulses, it can be determined based on the respiratory rate of the user and the blood oxygen saturation. Specifically, the following formula can be used for calculation:

$$P = Q * [60*(N-1)\backslash(t_N - t_1)] * \int_{t_1}^{t_N} (S_{target} - S_t) dt$$

P represents the calculated total amount of oxygen pulses per unit time, $t_N$ represents the time instant when respiratory action is detected for the N-th time, $S_{target}$ represents the target blood oxygen saturation, $S_t$ represents blood oxygen saturation at time instant t, Q represents a constant, the value of Q can be determined based on actual experience.

According to the above formula for calculating the total amount of oxygen pulses, it can be realized that the smaller the blood oxygen saturation is, the larger calculated total amount of oxygen pulses is, and the larger the respiratory rate $60*(N-1)\backslash(t_N-t_1)$ is, the greater the calculated total amount of oxygen pulses is, and the calculated total amount of oxygen pulses is the total amount of oxygen pulses that the user needs to inhale.

Through the above method, the total amount of oxygen pulses required by the user can be accurately calculated, so that the target operating gear can be accurately determined.

In an implementation, after the operating at the target operating gear, the method further includes:

obtaining a current blood oxygen saturation of the user, if the current blood oxygen saturation is between a first blood oxygen saturation and a second blood oxygen saturation, controlling the target operating gear to remain unchanged; if the current blood oxygen saturation is greater than the second blood oxygen saturation, reducing the target operating gear; if the current blood oxygen saturation is less than the first blood oxygen saturation, increasing the target operating gear; where the target blood oxygen saturation is greater than the first blood oxygen saturation and less than the second blood oxygen saturation.

After the target operating gear is determined, there may be a problem that the determined target operating gear is not very accurate, or the user may need to adjust the target operating gear again after inhaling oxygen at the target operating gear for a period of time. At this time, fine adjustments can be made based on the current target operating gear according to the current blood oxygen saturation. Under normal circumstances, the blood oxygen saturation of the user needs to be maintained between the first blood oxygen saturation and the second blood oxygen saturation. When the detected current blood oxygen saturation is between the first blood oxygen saturation and the second blood oxygen saturation, the target operating gear can be controlled to remain unchanged; when the current blood oxygen saturation is greater than the second blood oxygen saturation, the target operating gear can be reduced; when the current blood oxygen saturation is less than the second blood oxygen saturation, the target operating gear can be increased.

For example, the first blood oxygen saturation may be 94%, the second blood oxygen saturation may be 96%, and the target blood oxygen saturation may be 95%.

When operating in the pulse oxygen supply mode under the intelligent mode, the target operating gear is adjusted according to the current blood oxygen saturation, so that the target operating gear can be adjusted according to the user's oxygen inhalation to ensure the oxygen supply, while extending the service life of the device.

Table 2 shows the blood oxygen saturation data of the user when using oxygen generation device and not using oxygen generation device. As shown in Table 2, when the user is in a sitting state and not using oxygen generation device, the blood oxygen saturation is 95%, the respiratory rate is 25; when the user status is in a state of having exercised for 30 minutes and not using oxygen generation device, the blood oxygen saturation is 92%, and the respiratory rate is 30; when the user status is in a state of having exercised for 30 minutes and using the oxygen generation device, and the oxygen generation device is operating at operating gear 2 in the pulse mode, the blood oxygen saturation is 93% and the respiratory rate is 30; when the user status is in a state of having exercised for 30 minutes and using the oxygen generation device, and the oxygen generation device is operating at operating gear 4 in the pulse oxygen supply mode under the intelligent mode, the blood oxygen saturation is 96% and the respiratory rate is 32. It can be seen from this that compared with the ordinary pulse mode, the determined operating gear in the pulse oxygen supply mode under the intelligent mode is more accurate, and the blood oxygen saturation of the user can be within an appropriate range.

TABLE 2

| Device state | User state | Respiratory rate BPM | Blood oxygen saturation % | Gear |
| --- | --- | --- | --- | --- |
| Unused | Sit | 25 | 95 | / |
| Unused | Exercise for 30 minutes (Run) | 30 | 92 | / |
| Pulse mode | Exercise for 30 minutes (Run) | 30 | 93 | 2 |
| Intelligent mode (pulse mode) | Exercise for 30 minutes (Run) | 32 | 96 | 4 |

Therefore, the intelligent mode, pulse mode and continuous mode can be set on the control panel of the actual portable oxygen concentrator of the present disclosure. Initially, the user can select any one of these modes.

When the user selects the pulse mode, the portable oxygen concentrator will detect the respiratory state in real time. When the pressure value in the oxygen inhalation tube is less than the first trigger threshold, it will automatically calculate the single oxygen pulse amount according to the user's breathing frequency and the operating gear of the device, and complete the supply of the single oxygen pulse amount during the user's inhalation phase. When the user has no inhalation action or the inhalation force is weak, the portable oxygen concentrator will supply oxygen at regular intervals.

When the user selects the continuous mode, the continuous valve of the portable oxygen concentrator is in a normally open state for continuous oxygen supply. In the continuous mode, the portable oxygen concentrator will no longer detect the user's respiratory action, regardless of whether the user has an inhalation action. The portable oxygen concentrator still supplies oxygen continuously to ensure oxygen supply.

Figure 6:
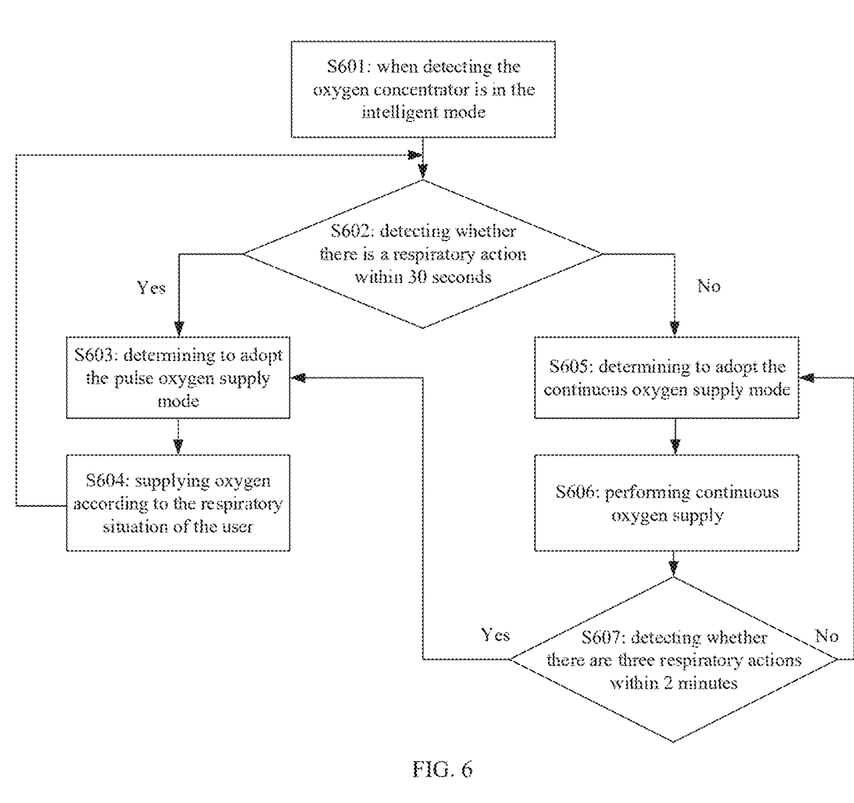
FIG. 6 is a schematic flowchart of another method for switching an oxygen supply mode provided by an embodiment of the present disclosure.

When the user selects the intelligent mode, both pulse mode and continuous mode can be considered to ensure oxygen supply and improve oxygen utilization. FIG. 6 is a schematic flowchart of another method for switching an oxygen supply mode provided by an embodiment of the present disclosure. As shown in FIG. 6, the method includes the following steps.

S601: Detecting when the oxygen concentrator is in the intelligent mode.

S602: Detecting whether there is a respiratory action within 30 seconds. If so, proceed with S603, otherwise, proceed with S605.

S603: Determining to adopt the pulse oxygen supply mode.

S604: Supplying oxygen according to the respiratory situation of the user, and continuing to determine whether there is a respiratory action within 30 seconds.

S605: Determining to adopt the continuous oxygen supply mode.

S606: Performing continuous oxygen supply. At the same time, proceeding with S607.

S607: Detecting whether there are three respiratory actions within 2 minutes. If so, it switches to the pulse oxygen supply mode. If not, it continues to use continuous oxygen supply.

Figure 7:
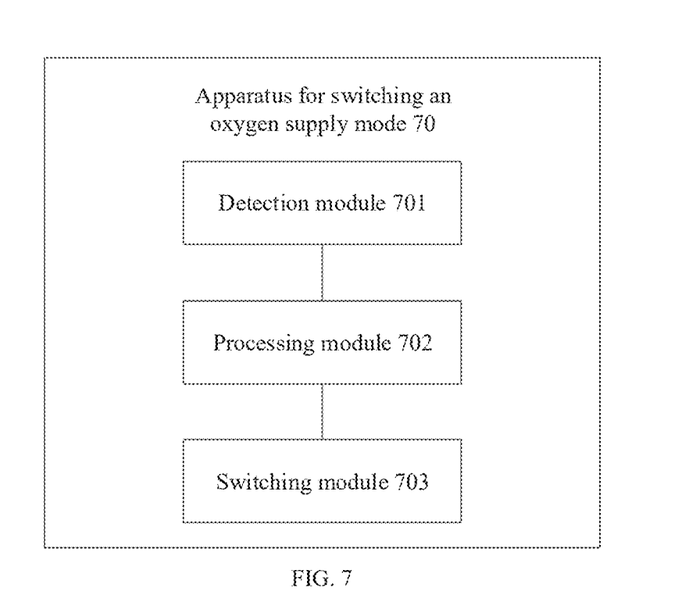
FIG. 7 is a schematic structural diagram of an apparatus for switching an oxygen supply mode provided by an embodiment of the present disclosure.

FIG. 7 is a schematic structural diagram of an apparatus for switching an oxygen supply mode provided by an embodiment of the present disclosure. The apparatus 70 includes:

a detection module 701, configured to detect a first respiratory state of a user when an intelligent mode is detected as activated;

a processing module 702, configured to determine a first oxygen supply mode according to the first respiratory state and supply oxygen according to the first oxygen supply mode;

a switching module 703, configured to detect a second respiratory state of the user under the first oxygen supply mode and determine, according to the second breathing mode, whether to switch the first oxygen supply mode to a second oxygen supply mode, where the oxygen supply mode includes a pulse oxygen supply mode and a continuous oxygen supply mode;

when supplying oxygen according to the first oxygen supply mode, the processing module 702 is specifically configured to:

when the first oxygen supply mode is the pulse oxygen supply mode, determine the target operating gear and operating at the target operating gear.

In an implementation, the first respiratory state is whether a respiratory action exists within a first preset duration; when determining the first oxygen supply mode based on the first respiratory state, the processing module 702 is specifically configured to:

when the first respiratory state indicates existence of a respiratory action within the first preset duration, determine the first oxygen supply mode to be the pulse oxygen supply mode, where the existence of the respiratory action represents that a pressure in an oxygen delivery tube at a first time instant is less than a first trigger threshold and a pressure in the oxygen delivery tube at a second time instant is greater than a second trigger threshold; and the second time instant is after the first time instant;

when the first respiratory state indicates inexistence of a respiratory action within the first preset duration, determine the first oxygen supply mode to be the continuous oxygen supply mode.

In an implementation, when determining, according to the second breathing mode, whether to switch the first oxygen supply mode to the second oxygen supply mode, the switching module 703 is specifically configured to:

the second respiratory state is the same as the first respiratory state when the first oxygen supply mode is the pulse oxygen supply mode, and when the second respiratory state indicates inexistence of a respiratory action within the first preset duration, switch the pulse oxygen supply mode to the continuous oxygen supply mode;

when the first oxygen supply mode is the continuous oxygen supply mode, switch the continuous oxygen supply mode to the pulse oxygen supply mode when the second respiratory state indicates existence of N respiratory action within a second preset duration.

In an implementation, the apparatus further includes: a determining module, where the determining module is specifically configured to:

obtain a first pressure curve of a previous operating cycle, and shift the first pressure curve downward by a first value to obtain a second pressure curve;

obtain a third pressure curve of a current operating cycle, and determine that there is an inhalation action when the third pressure curve and the second pressure curve have an intersection point; and determine that there is an exhalation action when a pressure difference at a corresponding time instant in the previous operating cycle and the current operating cycle exceeds a second value;

determine existence of N respiratory action within the second preset duration when a count value of an inhalation action and a count value of an exhalation action respectively reach N within the second preset duration.

In an implementation, when supplying oxygen according to the first oxygen supply mode, the processing module 702 is specifically configured to:

determine a blood oxygen saturation of the user under N respiratory action when the first oxygen supply mode is the pulse oxygen supply mode;

when the blood oxygen saturation is less than the target blood oxygen saturation, determine a total amount of oxygen pulses according to a respiratory rate of the user and the blood oxygen saturation under N respiratory action;

calculate a first multiplication result of the total amount of oxygen pulses and a first coefficient, calculate a second multiplication result of a square value of the total amount of oxygen pulses and a second coefficient, calculate an addition result of the first multiplication result, the second multiplication result and a third coefficient, determine the addition result as a target operating gear, and operate at the target operating gear;

and/or, when the blood oxygen saturation is greater than or equal to the target blood oxygen saturation, determine a default operating gear as a target operating gear and operate at the target operating gear.

In an implementation, when determining the total amount of oxygen pulses according to the respiratory rate of the user and the blood oxygen saturation under N respiratory action, the processing module 702 is specifically configured to:

calculate a difference between the target blood oxygen saturation and the blood oxygen saturation for each blood oxygen saturation, and calculate an integral result of the difference from a first time instant to a N-th time instant, where the N-th time instant represents a time instant when a respiratory action is detected for a N-th time;

calculate a third multiplication result of a fourth coefficient and a respiratory rate, calculate a fourth multiplication result of the third multiplication result and the integral result, and determine the fourth multiplication result as the total amount of oxygen pulses.

In an implementation, after operating at the target operating gear, the processing module 702 is further configured to:

obtain a current blood oxygen saturation of the user, if the current blood oxygen saturation is between a first blood oxygen saturation and a second blood oxygen saturation, control the target operating gear to remain unchanged; if the current blood oxygen saturation is greater than the second blood oxygen saturation, reduce the target operating gear; if the current blood oxygen saturation is less than the first blood oxygen saturation, increase the target operating gear; where the target blood oxygen saturation is greater than the first blood oxygen saturation and less than the second blood oxygen saturation.

The apparatus for switching an oxygen supply mode provided by an embodiment of the present disclosure can realize the method for switching an oxygen supply mode of an embodiment shown in FIG. 2, and the implementation principle and technical effect therebetween are similar, so it will not be repeated here.

Figure 8:
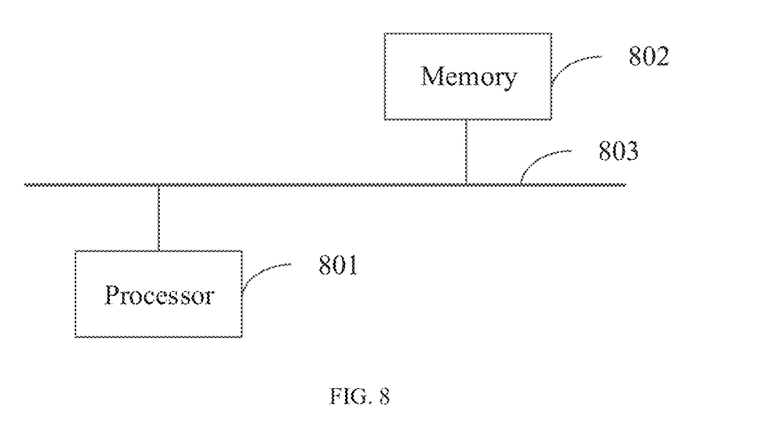
FIG. 8 is a schematic diagram of a hardware structure of an electronic device provided by an embodiment of the present disclosure.

FIG. 8 is a schematic diagram of a hardware structure of an electronic device provided by an embodiment of the present disclosure. As shown in FIG. 8, the electronic device provided by this embodiment includes: at least one processor 801 and a memory 802. The processor 801 and the memory 802 are connected through the bus 803.

In a specific implementation process, at least one processor 801 executes computer execution instructions stored in the memory 802, so that at least one processor 801 executes the method in the above method embodiment.

The specific implementation process of the processor 801 can be found in the above-mentioned method embodiments. The implementation principles and technical effects therebetween are similar and will not be described again in this embodiment.

In the embodiment shown in FIG. 8 above, it should be understood that the processor may be a central processing unit (CPU for short), can also be other general-purpose processors, digital signal processors (DSP for short), application specific integrated circuits (ASIC for short), etc. The general-purpose processor may be a microprocessor or the processor may be any conventional processor, etc. The steps of the method disclosed in conjunction with the disclosure can be directly embodied as being completed by a hardware processor, or completed by a combination of hardware and software modules in the processor.

The memory may include a high-speed random access memory (RAM) and may further include a non-volatile memory (NVM), such as at least one disk memory.

The bus can be an industry standard architecture (ISA) bus, a peripheral component interconnect (PCI) bus or an extended industry standard architecture (EISA) bus, etc. The bus can be divided into an address bus, a data bus, a control bus, etc. For ease of presentation, the bus in the drawings of the present disclosure is not limited to only one bus or one type of bus.

Embodiments of the present disclosure also provide a computer-readable storage medium. Computer-executable instructions are stored in the computer-readable storage medium. When the processor executes the computer-executed instructions, the methods of the above method embodiments are implemented.

An embodiment of the present disclosure also provides a computer program product, which includes a computer program that implements the method of the above method embodiment when executed by a processor.

The above-mentioned computer-readable storage medium, the above-mentioned readable storage medium can be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk. Readable storage media can be any available media that can be accessed by a general purpose or special purpose computer.

An exemplary readable storage medium is coupled to the processor such that the processor can read information from the readable storage medium and write information to the readable storage medium. Of course, the readable storage medium may also be a part of the processor. The processor and the readable storage medium may be located in an ASIC. Of course, the processor and the readable storage medium may also exist as discrete components in the device.

It should be noted that, in this document, the terms "comprising", "including" or any other variations thereof are intended to cover a non-exclusive inclusion, such that a process, method, article or device that includes a series of elements not only includes those elements, it also includes other elements not expressly listed or inherent in the process, method, article or apparatus. Without further limitation, an element defined by the statement "includes a . . . " does not exclude the presence of additional identical elements in a process, method, article, or device that includes that element.

The above serial numbers of the embodiments of the present disclosure are only for description and do not represent the advantages or disadvantages of the embodiments.

Through the above description of the embodiments, those skilled in the art can clearly understand that the methods of the above embodiments can be implemented by means of software plus the necessary general hardware platform. Of course, it can also be implemented by hardware, but in many cases the former is better implementation. Based on this understanding, the technical solution of the present disclosure can be embodied in the form of a software product in essence or that contributes to the existing technology. The computer software product is stored in a storage medium (e.g., ROM/RAM, disk, CD), including several instructions to cause a terminal device (which can be a mobile phone, computer, server, air conditioner, or network device, etc.) to execute the methods described in various embodiments of the present disclosure.

The above are only preferred embodiments of the present disclosure, and are not intended to limit the patent scope of the present disclosure. Any equivalent structure or equivalent process transformation made using the contents of the description and drawings of the present disclosure may be directly or indirectly used in other related technical fields, are all similarly included in the scope of patent protection of the present disclosure.

What is claimed is:

1. An electronic device, comprising:

at least one processor and memory;

the memory stores computer execution instructions;

the at least one processor executes the computer execution instructions stored in the memory, enabling the at least one processor to execute:

detecting a first respiratory state of a user when an intelligent mode is detected as activated;

determining a first oxygen supply mode according to the first respiratory state and supplying oxygen according to the first oxygen supply mode;

detecting a second respiratory state of the user under the first oxygen supply mode and determining, according to a second breathing mode, whether to switch the first oxygen supply mode to a second oxygen supply mode, wherein the oxygen supply mode comprises a pulse oxygen supply mode and a continuous oxygen supply mode;

wherein the supplying oxygen according to the first oxygen supply mode comprises:

determining a blood oxygen saturation of the user under N respiratory action when the first oxygen supply mode is the pulse oxygen supply mode;

upon determining the blood oxygen saturation is less than a target blood oxygen saturation, calculating a difference between the target blood oxygen saturation and the blood oxygen saturation for each blood oxygen saturation, and calculating an integral result of the difference from a first time instant to a N-th time instant, wherein the N-th time instant represents a time instant when a respiratory action is detected for a N-th time, calculating a third multiplication result of a fourth coefficient and a respiratory rate, calculating a fourth multiplication result of the third multiplication result and the integral result, and determining the fourth multiplication result as a total amount of oxygen pulses, calculating a first multiplication result of the total amount of oxygen pulses and a first coefficient, calculating a second multiplication result of a square value of the total amount of oxygen pulses and a second coefficient, calculating an addition result of the first multiplication result, the second multiplication result and a third coefficient, determining the addition result as a target operating gear, and operating at the target operating gear;

upon determining the blood oxygen saturation is greater than or equal to the target blood oxygen saturation, determining a default operating gear as a target operating gear and operating at the target operating gear.

2. The device according to claim 1, wherein the first respiratory state is whether a respiratory action exists within a first preset duration; the determining the first oxygen supply mode according to the first respiratory state comprises:

when the first respiratory state indicates existence of a respiratory action within the first preset duration, determining the first oxygen supply mode to be the pulse oxygen supply mode, wherein the existence of the respiratory action represents that a pressure in an oxygen delivery tube at a first time instant is less than a first trigger threshold and a pressure in the oxygen delivery tube at a second time instant is greater than a second trigger threshold; and the second time instant is after the first time instant;

when the first respiratory state indicates inexistence of a respiratory action within the first preset duration, determining the first oxygen supply mode to be the continuous oxygen supply mode.

3. The device according to claim 2, wherein the determining, according to the second respiratory state, whether to switch the first oxygen supply mode to the second oxygen supply mode comprises:

the second respiratory state is the same as the first respiratory state when the first oxygen supply mode is the pulse oxygen supply mode, and when the second respiratory state indicates inexistence of a respiratory action within the first preset duration, switching the pulse oxygen supply mode to the continuous oxygen supply mode;

when the first oxygen supply mode is the continuous oxygen supply mode, switching the continuous oxygen supply mode to the pulse oxygen supply mode when the second respiratory state indicates existence of N respiratory action within a second preset duration.

4. The device according to claim 3, wherein the at least one of the processors is further enabled to execute:

obtaining a first pressure curve of a previous operating cycle, and shifting the first pressure curve downward by a first value to obtain a second pressure curve;

obtaining a third pressure curve of a current operating cycle, determining that there is an inhalation action when the third pressure curve and the second pressure curve have an intersection point; and determining that there is an exhalation action when a pressure difference at a corresponding time instant in the previous operating cycle and the current operating cycle exceeds a second value;

determining existence of N respiratory action within the second preset duration when a count value of an inhalation action and a count value of an exhalation action respectively reach N within the second preset duration.

5. The device according to claim 1, wherein the at least one of the processors is further enabled to execute:

after operating at the target operating gear, obtaining a current blood oxygen saturation of the user, if the current blood oxygen saturation is between a first blood oxygen saturation and a second blood oxygen saturation, controlling the target operating gear to remain unchanged; if the current blood oxygen saturation is greater than the second blood oxygen saturation, reducing the target operating gear; if the current blood oxygen saturation is less than the first blood oxygen saturation, increasing the target operating gear; wherein the target blood oxygen saturation is greater than the first blood oxygen saturation and less than the second blood oxygen saturation.

6. A non-transitory computer-readable storage medium, wherein the non-transitory computer-readable storage medium stores computer execution instructions, and when a processor executes the computer execution instructions, following steps are executed:

detecting a first respiratory state of a user when an intelligent mode is detected as activated;

determining a first oxygen supply mode according to the first respiratory state and supplying oxygen according to the first oxygen supply mode;

detecting a second respiratory state of the user under the first oxygen supply mode and determining, according to a second breathing mode, whether to switch the first oxygen supply mode to a second oxygen supply mode, wherein the oxygen supply mode comprises a pulse oxygen supply mode and a continuous oxygen supply mode;

wherein the supplying oxygen according to the first oxygen supply mode comprises:

determining a blood oxygen saturation of the user under N respiratory action when the first oxygen supply mode is the pulse oxygen supply mode;

upon determining the blood oxygen saturation is less than a target blood oxygen saturation, calculating a difference between the target blood oxygen saturation and the blood oxygen saturation for each blood oxygen saturation, and calculating an integral result of the difference from a first time instant to a N-th time instant, wherein the N-th time instant represents a time instant when a respiratory action is detected for a N-th time, calculating a third multiplication result of a fourth coefficient and a respiratory rate, calculating a fourth multiplication result of the third multiplication result and the integral result, and determining the fourth multiplication result as a total amount of oxygen pulses, calculating a first multiplication result of the total amount of oxygen pulses and a first coefficient, calculating a second multiplication result of a square value of the total amount of oxygen pulses and a second coefficient, calculating an addition result of the first multiplication result, the second multiplication result and a third coefficient, determining the addition result as a target operating gear, and operating at the target operating gear;

upon determining the blood oxygen saturation is greater than or equal to the target blood oxygen saturation, determining a default operating gear as a target operating gear and operating at the target operating gear.

7. The non-transitory computer-readable storage medium according to claim 6, wherein the first respiratory state is whether a respiratory action exists within a first preset duration; the determining the first oxygen supply mode according to the first respiratory state comprises:

when the first respiratory state indicates existence of a respiratory action within the first preset duration, determining the first oxygen supply mode to be the pulse oxygen supply mode, wherein the existence of the respiratory action represents that a pressure in an oxygen delivery tube at a first time instant is less than a first trigger threshold and a pressure in the oxygen delivery tube at a second time instant is greater than a second trigger threshold; and the second time instant is after the first time instant;

when the first respiratory state indicates inexistence of a respiratory action within the first preset duration, determining the first oxygen supply mode to be the continuous oxygen supply mode.

8. The non-transitory computer-readable storage medium according to claim 7, wherein the determining, according to the second respiratory state, whether to switch the first oxygen supply mode to the second oxygen supply mode comprises:

the second respiratory state is the same as the first respiratory state when the first oxygen supply mode is the pulse oxygen supply mode, and when the second respiratory state indicates inexistence of a respiratory action within the first preset duration, switching the pulse oxygen supply mode to the continuous oxygen supply mode;

when the first oxygen supply mode is the continuous oxygen supply mode, switching the continuous oxygen supply mode to the pulse oxygen supply mode when the second respiratory state indicates existence of N respiratory action within a second preset duration.

9. The non-transitory computer-readable storage medium according to claim 8, wherein when a processor executes the computer execution instructions, following steps are further executed:

obtaining a first pressure curve of a previous operating cycle, and shifting the first pressure curve downward by a first value to obtain a second pressure curve;

obtaining a third pressure curve of a current operating cycle, determining that there is an inhalation action when the third pressure curve and the second pressure curve have an intersection point; and determining that there is an exhalation action when a pressure difference at a corresponding time instant in the previous operating cycle and the current operating cycle exceeds a second value;

determining existence of N respiratory action within the second preset duration when a count value of an inhalation action and a count value of an exhalation action respectively reach N within the second preset duration.

10. The non-transitory computer-readable storage medium according to claim 6, wherein when a processor executes the computer execution instructions, following steps are further executed:

after operating at the target operating gear, obtaining a current blood oxygen saturation of the user, if the current blood oxygen saturation is between a first blood oxygen saturation and a second blood oxygen saturation, controlling the target operating gear to remain unchanged; if the current blood oxygen saturation is greater than the second blood oxygen saturation, reducing the target operating gear; if the current blood oxygen saturation is less than the first blood oxygen saturation, increasing the target operating gear; wherein the target blood oxygen saturation is greater than the first blood oxygen saturation and less than the second blood oxygen saturation.

\* \* \* \* \*